United States Patent [19]

Pierce et al.

[11] 4,299,743

[45] Nov. 10, 1981

[54] SULFONATE-CONTAINING POLYMER

[75] Inventors: Percy E. Pierce, Monroeville; Karl F. Schimmel, Verona, both of Pa.

[73] Assignee: PPG Industries, Inc., Pittsburgh, Pa.

[21] Appl. No.: 153,385

[22] Filed: May 27, 1980

[51] Int. Cl.$^3$ .................................................. C08L 93/00
[52] U.S. Cl. ............................ 260/22 T; 260/22 R; 260/22 CB; 260/22 TN; 260/23 P; 528/288; 528/293; 528/304
[58] Field of Search ............. 260/22 R, 22 CB, 22 T, 260/22 TN, 23 P; 528/293, 304, 288

[56] References Cited

U.S. PATENT DOCUMENTS

| | | | |
|---|---|---|---|
| Re. 28,569 | 10/1975 | Cummings | 260/22 T |
| 2,028,091 | 1/1936 | Jaeger | 260/106 |
| 2,379,535 | 3/1945 | Lynch et al. | 260/480 |
| 2,415,255 | 2/1947 | Lynch | 260/481 |
| 2,507,030 | 5/1950 | Lynch | 260/481 |
| 2,562,154 | 6/1951 | Vitalis | 252/161 |
| 2,623,037 | 12/1952 | Jones | 260/79.3 |
| 3,236,881 | 2/1966 | Distler et al. | 260/501 |
| 3,336,271 | 8/1967 | Durocher | 260/79.3 |
| 3,392,129 | 7/1968 | Hoy et al. | 260/22 T |
| 3,471,460 | 10/1969 | Rees | 260/88.1 |
| 3,497,482 | 2/1970 | Hwa | 260/79.3 |
| 3,541,059 | 11/1970 | Schaper | 260/79.3 |
| 3,873,603 | 3/1975 | Schmadel | 260/481 R |
| 3,884,872 | 5/1975 | Falconio | 260/45.75 W |
| 3,932,562 | 1/1976 | Takahashi | 528/293 |
| 3,978,262 | 8/1976 | Fritz et al. | 528/293 |
| 4,154,955 | 5/1979 | Longley et al. | 560/151 |
| 4,167,639 | 9/1979 | Billenstein et al. | 560/151 |

OTHER PUBLICATIONS

Alkyd Resins, *Encyclopedia of Polymer Science & Technology,* John Wily & Sons, Inc., (1963), pp. 663–734.
Quantitative Organic Analysis Via Functional Groups, Siggie, 3rd ed., pp. 351–356.
The Addition of Bisulfite to Unsaturated Acids and Their Derivatives, Schenck and Danishefsky, pp. 1683–1689.

*Primary Examiner*—Lucille M. Phynes
*Attorney, Agent, or Firm*—Charles R. Wilson; George D. Morris

[57] ABSTRACT

Polymer containing a plurality of organic sulfonate-containing groups is capable of being dissolved or dispersed in a liquid medium. The polymer is useful as a pigment dispersant and as film-forming polymer in coating compositions.

26 Claims, No Drawings

SULFONATE-CONTAINING POLYMER

The present invention provides polymer capable of being dissolved or colloidally dispersed in a liquid medium, the polymer containing at least one organic sulfonate-containing group, which group is represented by the formula:

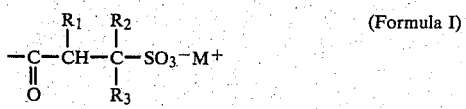
(Formula I)

wherein: $R_1$, $R_2$, and $R_3$ are each individually hydrogen or a monovalent organic group having a molecular weight in the range of from 15 to about 250; and $M^+$ is a monovalent cation or a monovalent fractional part of a polyvalent cation, which is ionically associated with the $-SO_3^-$ portion of the organic sulfonate group. The polymer may be linear or it may be branched. Preferably the polymer contains a plurality of organic sulfonate-containing groups represented by Formula I.

Usually $R_1$, $R_2$ and $R_3$ are each independently hydrogen, alkyl, cycloalkyl, aryl,

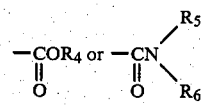

where $R_4$, $R_5$ and $R_6$ are each independently hydrogen, alkyl, cycloalkyl or aryl. When $R_1$, $R_2$, $R_3$, $R_4$, $R_5$ or $R_6$ is alkyl it is usually lower alkyl; typically it contains from 1 to about 18 carbon atoms. When $R_1$, $R_2$, $R_3$, $R_4$, $R_5$, or $R_6$ is cycloalkyl, it usually contains from about 5 to about 8 carbon atoms. When $R_1$, $R_2$, $R_3$, $R_4$, $R_5$, or $R_6$ is aryl, is usually contains from 6 to about 12 carbon atoms. Illustrative groups which may be used for $R_1$, $R_2$, $R_3$, $R_4$, $R_5$, and $R_6$ are hydrogen, methyl, ethyl, propyl, isopropyl, n-butyl, sec-butyl, isobutyl, hexyl, 2-ethylhexyl, octyl, cyclohexyl, cycloheptyl, cyclooctyl, phenyl, tolyl, xylyl, chlorophenyl, benzyl, α-naphthyl, β-naphthyl and hydroxyethyl.

The identity of $M^+$ may vary widely. Typical cations which may be used for $M^+$ include alkali metal, monovalent fractional part of alkaline earth metal, unsubstituted ammonium, and substituted ammonium. Specific examples include $Li^+$, $Na^+$, $K^+$, $Mg^{++}/2$, $Ca^{++}/2$, $Sr^{++}/2$, $Ba^{++}/2$, ammonium, methylammonium, ethylammonium, propylammonium, butylammonium, 2-hydroxyethylammonium, dimethylammonium, diethylammonium, dipropylammonium, dibutylammonium, N,N-di(2-hydroxyethyl)ammonium, N-methyl-N-(2-hydroxyethyl)ammonium, trimethylammonium, triethylammonium, tripropylammonium, tributylammonium, tri(2-hydroxyethyl)ammonium, N,N-dimethyl-N-(2-hydroxyethyl)ammonium and pyridinium. Preferably, $M^+$ is trisubstituted ammonium. Typically, $M^+$ may be trialkylsubstituted ammonium. Ordinarily the alkyl groups of the trialkylsubstituted ammonium each independently contain from 1 to about 4 carbon atoms. It is especially preferred that $M^+$ be N,N-dialkyl-N-hydroxyalkylammonium where the alkyl groups each independently contain from 1 to about 4 carbon atoms and where the hydroxyalkyl group contains from 2 to 4 carbon atoms. The preferred species is N,N-dimethyl-N-(2-hydroxyethyl)ammonium.

The invention also provides a method for producing a product polymer capable of being dissolved or colloidally dispersed in a liquid medium, which method comprises: (a) condensing each of at least some of the reactive groups of an intermediate polymer containing such reactive groups with the complementary reactive groups of a compound containing both the complementary reactive group and ethylenic unsaturation conjugated by at least one carbonyl group, to thereby provide the intermediate polymer with pendent groups containing such ethylenic unsaturation; and (b) reacting the ethylenic unsaturation of at least some of the pendent groups with bisulfite salt, metabisulfite salt, a mixture of bisulfite salt and metabisulfite salt or precursor thereof to provide at least one sulfonate group to the reacted pendent groups.

The polymer of the invention is useful as a component of coating compositions. It is especially useful as a pigment dispersant. In many instances, the presence of the polymer in coating compositions serves to improve adhesion of the resulting dry coating to chalking substrates. The polymer often is useful as a coalescing agent.

The reaction by means of which the compound containing ethylenic unsaturation conjugated by at least one carbonyl group is attached to the intermediate polymer is a condensation reaction between chemically reactive groups provided by the intermediate polymer and complementary chemically reactive groups provided by the compound. Suitable pairs of such groups are many. Illustrative examples include:
Acid anhydride group with amine group
Acid anhydride group with hydroxyl group
Acid anhydride group with mercaptan group
Acid halide group with amine group
Acid halide group with hydroxyl group
Carbonate group with amine group
Carboxyl group with amine group
Carboxyl group with ethylenimine group
Carboxyl group with epoxide group
Carboxyl group with hydroxyl group
Epoxide group with amine group
Isocyanate group with amine group
Isocyanate group with hydroxyl group The intermediate polymer used to form the product polymer may be any of the types of film-forming polymers known to be useful in coating compositions. Examples of such polymers are polyester polymers, alkyd polymers, acrylic polymers, urethane polymers, urea polymers, amide polymers and epoxy polymers. These polymers, when desired, may also contain functional groups characteristic of more than one class, as for example polyester amides, uralkyds, urethane acrylates, urethane amide acrylates, urea urethanes, etc. The film-forming polymer may be thermoplastic or it may be thermosetting.

Preparation of polymers containing chemically reactive groups is well known in the art. The chemically reactive groups may be introduced during formation of the polymer, they may be introduced after polymer formation or both of these.

Examples of acrylic polymers which may be employed include interpolymers of alkyl ester of acrylic acid, alkyl ester of methacrylic acid or a mixture of such esters. One or more other interpolymerizable ethylenically unsaturated monomers which contain the requisite chemically reactive group are included.

Examples of alkyl esters that may be employed include such alkyl acrylates and methacrylates as ethyl, methyl, propyl, butyl, hexyl, ethylhexyl and lauryl acrylates and methacrylates, as well as similar esters, having up to about 20 carbon atoms in the alkyl group. In some instances, corresponding esters of other unsaturated acid, for example, ethacrylic acid, crotonic acid, and other similar acids having up to about 6 carbon atoms can be employed.

Examples of interpolymerizable ethylenically unsaturated monomers which contain a chemically reactive group include the ethylenically unsaturated acids, anhydrides, hydroxyalkyl esters, glycidyl esters, isocyanatoalkyl esters, and aminoalkyl esters. Illustrative of such compounds are acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate, and 2-isocyanatoethyl methacrylate.

Some examples of additional copolymerizable ethylenically unsaturated monomers that may be optionally employed include monoolefinic and diolefinic hydrocarbons, such as styrene, alpha-methyl styrene, vinyl toluene, isobutylene, 2,3-dimethyl-1-hexene, 1,3-butadiene, and the like; halogenated monoolefinic and diolefinic hydrocarbons such as alpha-chlorostyrene, alpha-bromostyrene, parafluorostyrene, chloroethylene, chlorobutadiene and other halogenated diolefinic compounds; esters of organic and inorganic acids, such as vinyl acetate, vinyl propionate, isopropenyl acetate, vinyl chloride, allyl chloride, vinyl alpha-chloroacetate, dimethyl maleate and the like; organic nitriles such as acrylonitrile, methacrylonitrile, ethacrylonitrile, crotonitrile and the like. Diolefinic hydrocarbons should be used in only those limited amounts which do not produce significant gelling.

The above polymerizable monomers are mentioned as representative of the ethylenically unsaturated monomers which may be employed; essentially any such copolymerizable monomer can be used.

Examples of epoxy polymers which may be employed include polymers formed by reacting materials containing two epoxide groups per molecule with a material containing two active hydrogen atoms each reactive with an epoxide group. Materials having a functionality greater than two may also be used, but the amounts of these materials should be limited to those which do not produce significant gelling.

The diepoxides are of relatively high molecular weight having molecular weights of at least 350, preferably within the range of from about 350 to about 2000. The diepoxides can be essentially any of the well-known types such as diglycidyl ethers of polyphenols, for example, bisphenols such as Bisphenol A. These can be produced by etherification of a polyphenol with epihalohydrin in the presence of alkali. The phenolic compound may be bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxytertiarybutylphenyl)-2,2-propane, bis(2-hydroxynaphthyl)methane, 1,5-dihydroxynaphthalene, or the like. In many instances, it is desirable to employ such diepoxides having higher molecular weights and containing aromatic groups. This can be provided by reacting the diglycidyl ether above with a diphenol such as Bisphenol A, and then further reacting this product with epichlorohydrin to produce a diglycidyl ether.

Also suitable are the similar diglycidyl ethers of dihydric alcohols which may be derived from such dihydric alcohols as ethylene glycol, diethylene glycol, triethylene glycol, 1,2-propylene glycol, 1,4-propylene glycol, 1,5-pentanediol, bis(4-hydroxycyclohexyl)2,2-propane and the like.

There can also be used diglycidyl esters of dicarboxylic acids.

The diglycidyl ethers of diphenols are the preferred diepoxides for use in the practice of the present invention. Preferred diglycidyl ethers of diphenols have molecular weights of at least 350, preferably within the range of 350 to 2000.

Examples of materials containing two active hydrogen atoms each reactive with an epoxide group include compounds containing a single primary amino group, a single unsubstituted amide group, a single anhydride group, two secondary amino groups, two monosubstituted amide groups, or two carboxylic acid groups. Illustrative materials include maleic anhydride, dodecenylsuccinic anhydride, hexahydrophthalic anhydride, tetrahydrophthalic anhydride, chlorendic anhydride, succinic acid, and adipic acid.

Examples of polyester polymers which may be employed are those prepared from a polyol and a polycarboxylic acid and/or acid anhydride by techniques that are well-known in the esterification art. The polyester may be either saturated or unsaturated.

The polyester produced can be prepared from those polyols utilized in the preparation of conventional polyesters. Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, 1,1,1-trimethylolethane, 1,1,1-trimethylolpropane, tetramethylene glycol, 2,3-dihydroxybutane, 1,4-dihydroxybutane, 1,4-dihydroxy-2-ethylbutane, 1,6-dihydroxyhexane, 1,3-dihydroxyoctane, 1,9-dihydroxydecane, 2,2-diethylpropane-1,3-diol, 2,2-diethylbutane-1,3-diol, 4,5-dihydroxynonane, pentamethylene glycol, heptamethylene glycol, decamethylene glycol, 1,4-dihydroxy-2-butene, 2,7-dihydroxy-4-hexene, 2-ethylhexane-1,3-diol, glycerol, 1,2,6-hexanetriol, pentaerythritol, sorbitol, mannitol, methyl glycoside, 2,2-bis(hydroxyethoxyphenyl) propane, 2,2-bis(-betahydroxypropoxyphenyl) propane, 2-hydroxyethylhydroxyacetate, 1,1-bis(hydroxymethyl)nitroethane, and the like. Monofunctional alcohols may also be employed to supplement the polyols if desired. For example, more flexible polyesters are provided by employing a small amount of monofunctional alcohols to replace part of the more functional polyols. Useful alcohols include those having a carbon chain comprising from about 3 to about 18 carbon atoms. Those useful alcohols include primary, secondary, and tertiary alcohols, such as methanol, ethanol, propanol, isopropanol, 1-butanol, 2-butanol, tert-butanol, 1-pentanol, 3-pentanol, tert-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohols such as cyclohexanol and trimethylcyclohexanol.

Particularly useful polyols include diols, triols, tetrols and higher polyols. Generally, the diol component includes glycols of the formula $HO(CH_2)_nOH$ where n equals 2 to 10, glycols of the formulas $HO(CH_2CH_2O)_nH$ and $HO[CH(CH_3)CH_2O]_nH$ in which n equals 1 to 10, such as ethylene glycol, diethylene glycol, and the like, 2,2-dimethyl-1,3-propanediol, 2,2-diethyl-1,3-propanediol, 2,2-diethyl-1,3-propanediol, 3-methyl-1,5-pentanediol, N-methyl and N-ethyl diethanolamines. Others include 4,4'-methylenebiscyclohexanol, 4,4'-isopropylidenebiscyclohexanol and various xylenediols, hydroxymethylphenylethyl alcohols, hydroxymethylphenylpropanols, phenylenediethanols, phenylenedipropanols and heterocyclic diols such as 1,4-piperazine diethanol and the like. Some of the preferred diols include 2-methyl-2-ethyl-1,3-propanediol, 2-ethyl-1,3-hexanediol and 2,2-dimethyl-3-hydroxypropyl 2,2-dimethyl-hydroxypropionate and the like. The preferred tiols (trifunctional polyols) are trimethylolpropane, trimethylolethane, 1,2,3-propanetriol, 1,2,4-butanetriol, 1,2,6-hexanetriol and the like. Preferred tetrols are pentaerythritol and oxyalkylated pentaerythritol. Preferred higher polyols are dipentaerythritol, tripentaerythritol and resinous polyols, such as for example, a copolymer of styrene and allyl alcohol sold by Monsanto Chemical Company under the trademark RJ-100.

Illustrative of the various polycarboxylic acids that can be employed to react with the polyol include a variety of dicarboxylic acids such as oxalic acid, malonic acid, succinic acid, glutaric acid, adipic acid, pimelic acid, suberic acid, azelaic acid, sebacic acid, phthalic acid, isophthalic acid, terephthalic acid, tetrahydrophthalic acid, hexahydrophthalic acid, chlorendic acid, and tetrachlorophthalic acid. Anhydrides of these acids, where they exist, can be employed. Not only may single acids or anhydrides be used, but mixtures of acids, mixtures of anhydrides or mixtures of acids and anhydrides may be employed.

Minor amounts of tricarboxylic acids or acids of higher carboxylic functionality may be employed.

Monocarboxylic acids may also be used to supplement the polycarboxylic acids if desired. Usually such acids are saturated, such as acetic acid, propionic acid, butyric acid, valeric acid, caproic acid, enanthic acid, caprylic acid, pelargonic acid, capric acid, undecylic acid, lauric acid, myristic acid, palmitic acid, stearic acid, 3,4-dimethylpentanoic acid and dimethylacetic acid, however, unsaturated monocarboxylic acids such as acrylic acid, methacrylic acid, ethacrylic acid, crotonic acid, tiglic acid, angelic acid, cinnamic acid, oleic acid, ricinoleic acid, erucic acid, sorbic acid, linoleic acid, and linolenic acid may be used. Preferred monocarboxylic acids are acrylic acid, crotonic acid, tiglic acid, angelic acid and cinnamic acid.

Hydroxy substituted carboxylic acids are also useful. Examples of these include glycolic acid, lactic acid, beta-hydroxybutyric acid, gluconic acid, tartaric acid, malic acid, tartronic acid, saccharic acid, citric acid, 9,10-dihydroxystearic acid, 12-hydroxystearic acid, ricinoleic acid, dimethylolpropionic acid and the like.

For purposes of the present invention, the aromatic nuclei of aromatic acids such as phthalic acid are generally regarded as saturated since the double bonds do not ordinarily react by addition as do ethylenic groups. Therefore, wherever the term "saturated" is utilized, it is to be understood that such term includes aromatic unsaturation or other form of unsaturation which does not react by addition, unless otherwise qualified.

The polyester intermediate polymer usually contains as the chemically reactive groups a plurality of carboxyl groups and/or hydroxyl groups, although other chemically reactive groups may be used in addition to or in lieu of these particular kinds of groups.

Alkyd polymers are a class of polyester polymers which may be used and which are generally produced by reacting polyhydric alcohol, polycarboxylic acid or acid anhydride, and an oil or fatty acid. The alkyd polymers are themselves well known; see "Alkyd Resins", *Encyclopedia of Polymer Science and Technology*, John Wily & Sons, Inc., (1963), pages 663–734, which is incorporated herein by reference.

Illustrative of polyhydric alcohols and polycarboxylic acids which may be used are the polyols and polycarboxylic acids described above. As used herein, the term "fatty acid" refers to monocarboxylic acid derived from natural fats and oils or their synthetic equivalents.

The oil which may be employed in preparing the alkyd resin can be drying oil, semi-drying oil, non-drying oil or a mixture thereof. Drying oil, semi-drying oil or a mixture thereof is preferred. Examples of drying oils or semi-drying oils that can be employed in preparing the alkyd resin include soya oil, segregated cottonseed oil, safflower oil, dehydrated castor oil, linseed oil, tung oil, repeseed oil, hempseed oil, oiticica oil, poppyseed oil, rubberseed oil, soybean oil, sunflower oil, black walnut oil, perilla oil, herring oil, menhaden oil and sardine oil. Examples of non-drying oils are coconut oil, castor oil, cottonseed oil, peanut oil and olive oil. Where the oil per se is employed, it becomes necessary, as is well known in the art, to first convert the oil to a monohydroxy ester or polyhydroxy ester by alcoholysis before adding the acid or acid anhydride and esterifying. Examples of polyols which may be used in the alcoholysis reaction include glycerine, 1,1,1-trimethylolethane, 1,1,1-trimethylolpropane and pentaerythritol. The average functionality of the polyol used in the alcoholysis reaction should be at least two hydroxyl groups per molecule. It is preferred that the average functionality be about three hydroxyl groups per molecule. When the polyol has an average functionality significantly greater than three, it is preferred that monocarboxylic acid be added in an amount which would reduce the average functionality to about three hydroxyl groups per molecule. The monocarboxylic acid may be added during the alcoholysis reaction or during formation of the alkyd resin. For example, when pentaerythritol is employed, one molar part monocarboxylic acid may be added per mole pentaerythritol to reduce the functionality of the resulting product to about three hydroxyl groups per molecule.

Synthetic alcoholysis products of drying oil, semi-drying oil, non-drying oil or a mixture thereof may be used in lieu of all or part of the natural oil. Such synthetic alcoholysis products are well known in the art and are prepared by reaction polyol having a functionality greater than two hydroxyl groups per molecule with fatty acid. Preferably the fatty acid, including mixtures of fatty acids, should comprise enough drying fatty acid or semi-drying fatty acid so that the alkyd resin will possess satisfactory drying properties. Usually at least half of the fatty acid is drying fatty acid, semi-drying fatty acid or a mixture thereof. The principles respecting the average hydroxyl functionality of the synthetic alcoholysis product are the same as for the alcoholysis reaction product heretofore discussed.

Acidolysis of the drying oil, semi-drying oil, non-drying oil or a mixture thereof may also be employed. When so used, the polyol is added during formation of the alkyd resin to compensate for the carboxyl groups of the acidolysis reaction product.

The uralkyd resins are usually prepared by reacting alkyd resins with polyisocyanates and, optionally, polyols. The polyisocyanates are usually diisocyanates and the polyols, if used, are usually diols, although compounds of higher functionality may be used in limited amounts.

The diisocyanates usually contain from about 3 to about 36 carbon atoms. Generally, the diisocyanate contains from about 8 to about 15 carbon atoms. Examples of suitable diisocyanates include trimethylene diisocyanate, tetramethylene diisocyanate, pentmethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate, 2,6-tolylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenylether and 2,3-bis(8-isocyanatooctyl)-4-octyl-5-hexylcyclohexene. Mixtures of diisocyanates may be used.

The preferred diisocyanates are 2,4-tolylene diisocyanate, 2,6-tolylene diisocyanate, 1-isocyanatomethyl-5-isocyanato-1,3,3-trimethylcyclohexane, bis(4-isocyanatophenyl)methane, bis(4-isocyanatocyclohexyl)methane and toluene diisocyanate, which is a mixture usually comprising about 80 percent 2,4-tolylene diisocyanate and about 20 percent 2,6-tolylene diisocyanate, although the proportions can vary somewhat.

Examples of suitable diols that may be employed are those described above with respect to the polyester polymers and those described below with respect to the polyurethane polymers.

The polyurethanes comprise another class of polymers which may be used in the invention. Essentially the polyurethanes are condensation products of a polyisocyanate and a compound having at least two reactive hydrogen atoms, i.e., hydrogen atoms determinable by the Zerewitinoff method.

Examples of useful active hydrogen-containing compounds include polyesters prepared from polycarboxylic acids and polyhydric alcohols, polyhydric polyalkylene ethers having at least two hydroxy groups, polythioether glycols, polyester amides, etc.

The polyester or polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., acids, with polyalcohols, such as ethylene glycol, diethylene glycol, pentaglycol, glycerol, sorbitol, triethanolamine, di-(beta-hydroxyethyl)ether, etc., and/or amino-alcohols such as ethanolamine, 3-aminopropanol, 5-aminopentanol-1,10-aminodecanol, 6-amino-5-methylhexanol-1, p-hydroxymethylbenzylamine, etc., and with mixtures of the above polyalcohols and amines, ethylene diamine, 3-methylhexamethylenediamine, decamethylenediamine and m-phenylenediamine, etc., and/or aminoalcohols, etc. In the esterification or amide formation the acid per se may be used for condensation or where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol, 2-methyl-2,4-dihydroxypentane, 2-ethyl-1,3-dihydroxyhexane, hexamethylene glycol, styrene glycol, diethylene glycol, tetraethylene glycol, polythioethylene glycol, polyethylene glycols 200, 400, 600, etc., dipropylene glycol, tripropylene glycol, trithiopropylene glycol, polypropylene glycols 400, 750, 1200, 2000, etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, propylene-1,2-diisocyanate, cyclohexylene diisocyanate, m-phenylene diisocyanate, 2,4-tolylene diisocyanate, 3,3'-dimethoxy-4,4'-biphenylene diisocyanate, 3,3'-dichloro-4,4'-biphenylene diisocyanate, triphenylmethane triisocyanate, 1,5-naphthalene diisocyanate, hydrogenated toluene diisocyanate, methylene bis(cyclohexylisocyanate), isophorone diisocyanate, trimethylhexamethylene diisocyanate, lysine diisocyanate methyl ester or polyisocyanates in a blocked or inactive form, such as the bisphenyl carbonates of tolylene diisocyanate and 1,5-naphthalene diisocyanate, etc.

The polyamide polymers may be prepared by reacting polycarboxylic acids with polyamines. Usually the polycarboxylic acids and polyamines are difunctional, although some materials of higher functionality may be included to induce some branching.

Particularly preferred polycarboxylic acids are dicarboxylic acids produced by reacting two molecules of fatty acid having conjugated double bonds, such as linolenic acid, by the Diels-Alder mechanism.

Examples of polyamines which may be employed include ethylenediamine, propylenediamine, tetramethylenediamine, pentamethylenediamine, hexamethylenediamine, octamethylenediamine, decamethylenediamine, 3-methylhexamethylenediamine, triglycoldiamine, 3,3'-diaminodipropyl ether, p-xylylenediamine, piperazine, N-ethylethylenediamine, N-phenylethylenediamine, triethylene-tetramine and tetraethylenepentamine.

The polyurea polymers may be prepared by reacting a polyisocyanate with a polyamine, a polyketimine and water, or a polyaldimine and water. Usually the polyisocyanate, the polyamine, the polyketimine and the polyaldimine are difunctional, although some materials of higher functionality may be included to induce some branching. Most often when a polyamine is employed, the amino functionality is primary amino, although secondary amino can be used.

The polyketimines and polyaldimines can be viewed as blocked primary polyamines which can be unblocked by reaction with water, the unblocked primary polyamine then being available for reaction with the polyisocyanate.

Any of the diisocyanates described above with respect to the uralkyds or polyurethanes may be used for producing polyureas. Similarly, any of the diamines described above with respect to the polyamides may be employed for producing polyureas.

It is preferred to employ a diketimine or a dialdimine represented by the general formula

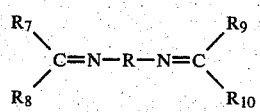

wherein R is a bivalent organic group, and $R_7$, $R_8$, $R_9$ and $R_{10}$ are each independently hydrogen or monovalent organic groups having from 1 to 8 carbon atoms, such as alkyl or aryl. It is preferred that R be an alkylene group of from 2 to about 6 carbon atoms. Generally the diketimines or dialdimines are prepared by reacting a primary diamine with carbonyl compounds represented by the structures:

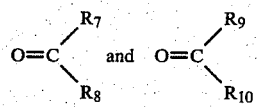

while removing water from the system, wherein $R_7$, $R_8$, $R_9$ and $R_{10}$ are as previously indicated. If, as preferred, $R_7=R_9$ and $R_8=R_{10}$, it is apparent that the primary diamine may be reacted with one of the above carbonyl compounds.

Usually at least one of $R_7$ and $R_8$ is organic and at least one of $R_9$ and $R_{10}$ is organic. Preferably $R_7$, $R_8$, $R_9$ and $R_{10}$ are all organic. It is especially preferred that $R_7$, $R_8$, $R_9$ and $R_{10}$ are each independently lower alkyl groups containing from 1 to 4 carbon atoms. Examples of the carbonyl compounds include aldehydes and ketones, such as acetone, methyl ethyl ketone, methyl isobutyl ketone, methyl n-butyl ketone, ethyl isopropyl ketone, acetaldehyde, propionaldehyde, butyraldehyde, isobutyraldehyde, and the like.

Irrespective of its type or of its manner of preparation, the intermediate polymer should contain at least one, and preferably a plurality of chemically reactive groups. For example, the polyester polymers, the alkyd polymers, the uralkyd polymers and the acrylic polymers may be prepared having residual hydroxyl or carboxyl functionality, as is known in the art. The epoxy polymers typically have hydroxyl functionality by virtue of the opening of the epoxide ring. Urethane polymers may be prepared which have residual isocyanato functionality or residual hydroxyl functionality. Polyamide polymers may typically have residual carboxyl functionality or residual amino functionality. Urea polymers may have residual isocyanato functionality or residual blocked or unblocked amino functionality. The chemically reactive groups may be located at the terminal positions, they may be attached to the backbone of the polymer at various intermediate positions, or both of these. Where it is desired, for example to provide polyamide polymers, polyurethane polymers or polyurea polymers with hydroxyl functional groups attached to the polymer backbone at various intermediate points, a diisocyanate having an acrylyl group which is prepared by reacting one molar part of a triisocyanate with one molar part of acrylic acid or one molar part of 2-hydroxyethyl acrylate may be used as all or a portion of the diisocyanate employed in preparing the polymer, followed by reacting the acrylyl groups of the polymer with hydroxylamine or ethanolamine via nucleophilic addition.

Examples of compounds containing both a complementary reactive group and ethylenic unsaturation conjugated by at least one carbonyl group include: acrylic acid, methacrylic acid, ethacrylic acid, crotonic acid, tiglic acid, angelic acid, cinnamic acid, maleic acid, fumaric acid, maleic anhydride, acrylic acid chloride, methacrylic acid chloride, 2-hydroxyethyl acrylate, 2-hydroxyethyl methacrylate, 2-hydroxypropyl acrylate, 2-hydroxypropyl methacrylate, 3-hydroxypropyl acrylate, 3- hydroxypropyl methacrylate, 2-isocyanatoethyl acrylate, 2-isocyanatoethyl methacrylate, glycidyl acrylate, glycidyl methacrylate, 2-dimethylaminoethyl acrylate, 2-dimethylaminoethyl methacrylate, vinylidene carbonate, N-carbamylmaleimide, acrylamide, methacrylamide acid esters of malic acid, and acid esters of itaconic acid.

Examples of suitable bisulfite salts include sodium bisulfite, potassium bisulfite, magnesium bisulfite, calcium bisulfite, unsubstituted ammonium bisulfite, and substituted ammonium bisulfite.

Examples of suitable metabisulfite salts include sodium metabisulfite, potassium metabisulfite, magnesium metabisulfite, calcium metabisulfite, unsubstituted ammonium metabisulfite, and substituted ammonium metabisulfite.

Precursors of the bisulfite salt or the metabisulfite salt may be employed. The preferred precursor is amine, water and sulfur dioxide. The amine may be primary, secondary or tertiary. A mixture of amines may be used if desired. Examples of suitable amines include methylamine, ethylamine, propylamine, butylamine, ethanolamine, dimethylamine, diethylamine, dipropylamine, dibutylamine, diethanolamine, N-methylethanolamine, trimethylamine, triethylamine, tripropylamine, tributylamine, triethanolamine, N,N-diethylethanolamine and pyridine. The tertiary amines are preferred.

Preferably the amine is added to the intermediate polymer which has been provided with pendent groups containing ethylenic unsaturation conjugated by at least one carbonyl group, then sulfur dioxide is bubbled through the reaction mixture. Preferably the sulfur dioxide is introduced through a fritted bubbler tube so as to form many small bubbles. The reaction is conveniently carried out at ambient temperature and pressure although somewhat greater temperatures and/or pressures can be satisfactorily employed.

Although it is preferred to produce the polymer of the invention according to the sequence of steps described above, the sequence may, in many cases, be modified.

In one such modification, which may be used where the polymer is produced by condensation rather than by addition, the compound containing both the complementary reactive group and ethylenic unsaturation conjugated by at least one carbonyl group is reacted with a monomer containing the reactive group to provide an ethylenically unsaturated monomer. The ethylenically unsaturated monomer is condensed with other monomers to form an intermediate polymer having pendent groups containing ethylenic unsaturation. The ethylenic unsaturation of at least some of the pendent groups is then reacted with bisulfite salt, metabisulfite salt, a mixture of bisulfite salt and metabisulfite salt or precursor thereof to provide at least one sulfonate group to the reacted pendent groups.

In another method which may be used where the polymer is produced by condensation rather than by addition, the compound containing both the complementary reactive group and ethylenic unsaturation conjugated by at least one carbonyl group, monomer containing the reactive group and other monomer are condensed to form an intermediate polymer having pendent groups containing ethylenic unsaturation. The ethylenic unsaturation of at least some of the pendent groups is then reacted with bisulfite salt, metabisulfite salt, a mixture of bisulfite salt and metabisulfite salt, or precursor thereof to provide at least one sulfonate group to the reacted pendent groups.

It is also permissible, when the reaction conditions are not so severe as to decompose significant amounts of the organic sulfonate-containing groups, to react the ethylenic unsaturation of a compound containing both the complementary reactive group and ethylenic unsaturation conjugated by at least one carbonyl group with bisulfite salt, metabisulfite salt, a mixture of bisulfite salt and metabisulfite salt or precursor thereof to provide an intermediate compound containing the complementary reactive group and at least one sulfonate group. The complementary reactive groups of the intermediate compound may then be condensed with at least some of the reactive groups of the intermediate polymer to the product polymer.

Similarly, if the reaction conditions are not so severe as to decompose significant amounts of the organic sulfonate-containing groups, the complementary reactive groups of the above intermediate compound may be reacted with the reactive group of a monomer to form a monomer containing at least one sulfonate group which is then interpolymerized with other monomers to produce the product polymer.

In another method which may be used where reaction conditions are not so severe as to decompose significant amounts of the organic sulfonate-containing groups and where the polymer is produced by condensation rather than by addition, the product polymer may be prepared by concurrently reacting (1) the compound containing both the complementary reactive group and ethylenic unsaturation conjugated by at least one carbonyl group, (2) monomer containing the reactive group, (3) other monomer, and (4) bisulfite salt, metabisulfite salt, a mixture of bisulfite salt and metabisulfite salt, or precursor thereof.

The liquid medium in which the polymer of the present invention may be dissolved or colloidally dispersed may be organic, aqueous or it may comprise both water and an organic portion. When the liquid medium comprises both water and an organic portion, the components are usually miscible in the proportions employed. The relationship between the liquid medium and the polymer depends upon the absolute and relaive natures of these materials and upon the relative amounts used. Such factors as solubility, miscibility, polarity, hydrophilicity, hydrophobicity, lyophilicity and lyophobicity are some of the factors which may be considered. Examples of liquid materials which may be used include water, acetone, methyl ethyl ketone, methyl isobutyl ketone, methyl amyl ketone, ethylamyl ketone, methanol, ethanol, propanol, isopropanol, butanol, sec-butanol, cyclohexanol, 2-methoxyethanol, 2-ethoxyethanol, 2-butoxyethanol, 2-hexoxyethanol, 2-phenoxyethanol, 2-methoxyethyl acetate, 2-ethoxyethyl acetate, 2-butoxyethyl acetate, 2-butoxyethyl butyl ether, benzene, toluene, xylene, hexane, heptane, octane, naphtha, ethyl acetate, isopropyl acetate, butyl acetate, amyl acetate and methylamyl acetate.

The preferred liquid media are those containing water. Usually the liquid medium comprises both water and an organic portion, miscible in the proportions employed.

The principles respecting the formation of polymer solutions, polymer nonaqueous dispersions, polymer nonaqueous pseudodispersions and polymer aqueous emulsions are well known in the art. The polymer of the present invention may be used in any of these systems.

Although in many instances it is permissible for the polymer of the present invention to also have sulfonate groups attached directly to the backbone of the polymer, it is preferred that the polymer be substantially devoid of such directly attached sulfonate groups, particularly where the polymer is to be used in a liquid medium containing water. It is especially preferred that the polymer be totally devoid of such directly attached sulfonate groups. Although it is not desired to be bound by any theory, it is believed that having the sulfonate groups located on pendent groups permits the charge provided by the sulfonate groups to come more readily to the organic-water interface and permits the polymer molecule to collapse on itself. This appears to result in solutions or dispersions of lower viscosity that when sulfonate groups are attached directly to the backbone of the polymer.

The amount of sulfonate groups present in the polymer of the present invention may vary widely. Usually the amount of sulfonate groups present in the polymer is in the range of from about 0.1 to about 3 millimoles of sulfonate groups per gram of polymer. Typically the amount is in the range of from about 0.2 to about 2.5 millimoles of sulfonate groups per gram of polymer. An amount in the range of from about 0.3 to about 2 millimoles of sulfonate groups per gram of polymer is preferred.

The number average molecular weight of the polymer of the present invention may also vary widely. Generally the polymer has a number average molecular weight of at least about 1000. Typically, the number average molecular weight of the polymer is in the range of from about 1000 to about 150,000. Preferably, the number average molecular weight is in the range of from about 1000 to about 50,000.

The polymer of the present invention may optionally also contain at least one, or more typically a plurality of, other groups, such as for example, carboxyl groups, which often assist in dissolution or dispersion of the polymer in the liquid medium.

Coating compositions containing polymer of the invention usually also contain a liquid medium in which the polymer is dissolved or dispersed. The coating composition may also contain various optional integredients which may be employed in their customary amounts for their customary purposes so long as they do not seriously interfere with good coatings practice. Examples of these optional ingredients include other film-forming polymers, dyes, tints, pigments, plasticizers, viscosity control agents, surfactants and crosslinking agents such as aminoplast resin, urea-aldehyde resin, phenoplast resin or blocked polyisocyanate resin. This listing of optional ingredients is by no means exhaustive.

The coating compositions are usually prepared by simply admixing the various ingredients. Although mixing is usually accomplished at room temperature, elevated temperatures are sometimes used. The maximum temperature which is usable depends upon the heat stability of the ingredients. Temperatures above about 150° C. are only rarely employed.

The amounts of materials in the coating composition can vary widely. Usually the film-forming polymer constitutes from about 5 percent to about 70 percent of the coating composition. From about 10 percent to about 50 percent by weight is ordinarily employed. The polymer containing a plurality of organic-sulfonate groups typically constitutes from about 0.1 percent to 100 percent by weight of the film-forming polymer. From about 0.2 percent to about 30 percent by weight of the film-forming polymer is preferred.

The amount of liquid medium may also vary widely. An amount in the range of from about 10 percent to about 95 percent by weight of the coating composition is normally employed. An amount in the range of from about 20 percent to about 70 percent by weight of the coating composition is preferred.

In the illustrative examples which follow, all parts are parts by weight and all percentages are percentages by weight unless otherwise specified.

EXAMPLE I

A reactor equipped with an agitator, a thermometer, a heater, a packed column and condenser set for total distillation, a thermometer at the top of the packed column, a fritted bubbler tube and a source of nitrogen is charged with 2606.1 parts air drying fatty monocarboxylic acid (Emersol 315, Emery Industries, Inc.), 1162.2 parts pentaerythritol, 992.4 parts phthalic anhydride, 671.4 parts crotonic acid and 9.75 parts dibutyl tin oxide. The introduction of nitrogen is begun and the heater is turned on. Forty-five minutes later the temperature of the reaction mixture is 90° C. and the nitrogen is turned off. During the ensuing reaction, the temperature at the top of the packed column is not allowed to exceed 100° C. Eighty-five minutes after turning the nitrogen off the temperature is 193° C. One hundred ten minutes later the temperature is 230° C. The reaction mixture is then held at 230° C. for 15 minutes at which time 401 parts water have been removed. The condenser is set for azeotropic distillation and 168 parts xylene is added. Forty-five minutes later the temperature is 230° C. After a further period of 30 minutes the temperature is 238° C. Twenty minutes later the temperature is 240° C. The reaction mixture is held at a temperature of 240° C. for 10 minutes, the heater is turned off and 1888.5 parts 2-butoxyethanol is added. The reaction mixture is then allowed to cool to room temperature. Seventeen hours and thirty minutes after turning the heater off the temperature is 25° C. and 735 parts dimethylethanolamine is added. An exotherm is observed which raises the temperature of the reaction mixture to 30° C. in less than 2 minutes. Two minutes after adding the dimethylethanolamine the temperature is 29° C. and 407.1 parts water is added. Eight minutes later the temperature is 22° C. and the addition of 483 parts sulfur dioxide through the fritted bubbler tube is begun. One hour later 220 parts of the sulfur dioxide has been added and the temperature is 23° C. After another hour the addition of sulfur dioxide is completed and the temperature is 24° C. The heater is then turned on and the reaction mixture is heated to 90° C. Two hours after turning the heater on the temperature is observed to be 90° C. The reaction mixture is held at 90° C. for an additional 4¼ hours at which time a sample of the reaction mixture when admixed with water remains clear. The heater is then turned off and the reaction mixture is poured into containers. The product is a sulfonated alkyd resin composition having a solids content of 64.3 percent by weight when a sample is dried at 150° C. for 2 hours and a Gardner-Holdt viscosity of X at 25° C.

EXAMPLE II

An intermediate composition is prepared by admixing 100 parts water, 0.2 part aminomethylpropanol composition (95% aminomethylpropanol, 5% water), 7.6 defoamer (DREW L-475; Drew Chemical Co.) and 7.5 parts of the sulfonated alkyd resin composition of Example I using a Cowles dissolver at slow speed. To 115.3 parts of the above intermediate composition is added 3.5 parts clay (Bentone LT; National Lead Co.) and the composition is admixed for 15 minutes using a Cowles dissolver at 3000 revolutions per minute. The product is a clay dispersion.

EXAMPLE III

An intermediate composition is prepared by admixing 100 parts water, 100 parts ethylene glycol, 3.8 parts defoamer (Drew L-475) and 20 parts of the sulfonated alkyd resin composition of Example I using a Cowles dissolver at slow speed. To 223.8 parts of the above intermediate composition is added 400 parts red iron oxide and the composition is admixed using a Cowles dissolver at high speed until a Hegman value of 6 is obtained. The product is a red iron oxide pigment dispersion.

EXAMPLE IV

A reactor equipped with an agitator, a thermometer, a heater, a packed column and condenser set for total distillation, a thermometer at the top of the packed column and a source of nitrogen is charged with 1042.4 parts air drying fatty monocarboxylic acid (Emersol 315), 464.9 parts pentaerythritol, 268.6 parts crotonic acid and 4 parts dibutyl tin oxide. The introduction of nitrogen is begun and the heater is turned on. After the air is purged, the nitrogen is turned off. Forty-five minutes after turning the heater on the temperature of the reaction mixture is 172° C. and water condensate is observed. Thirty minutes later the temperature is 185° C. and the reaction mixture is clear. The reaction mixture is heated to 230° C. Three hours and 15 minutes after resin clearing the temperature is 230° C. The reaction mixture is continued to be held at 230° C. for a further 90 minutes at which time 87.36 parts water have been collected. The heater is turned off and the reaction mixture is allowed to cool. Forty-five minutes later the temperature is 110° C. and the addition of 535.9 parts 1-isocyanatomethyl-5-isocyanato-1,3,3-trimethylcyclohexane is begun. One hour later the temperature is 110° C. and the addition is completed. Forty-five minutes later the temperature is 107° C. After a further period of 3½ hours the temperature is 108° C. An addition of 578 parts 2-butoxyethanol is made and the reaction mixture is admixed, the reaction mixture is poured into containers and allowed to cool to room temperature. The product is an unsaturated uralkyd resin composition.

A reactor equipped with an agitator, a thermometer, a heater, a condenser set for total reflux and a fritted bubbler tube is charged sequentially with 997.86 parts of the above unsaturated uralkyd resin composition, 47 parts dimethylethanolamine, and 27 parts water. Two hours later the temperature is 20° C. and the addition of 32 parts sulfur dioxide through the fritted bubbler tube is begun. One hour later the temperature is 22° C. and the addition is completed. The heater is then turned on and the reaction mixture is heated to 90° C. Seventy minutes after turning the heater on the temperature is observed to be 90° C. The reaction mixture is held at 90° C. for an additional 6 hours and 50 minutes at which time a sample of the reaction mixture when admixed with water remains clear. The heater is turned off and the reaction mixture is poured into containers. The product is a sulfonated uralkyd resin composition.

A sample of the above sulfonated uralkyd resin composition is drawn down on a steel panel using a 0.0762 millimeter wire wound bar and allowed to air dry. The resulting film is observed to be tack-free one hour after drawdown.

EXAMPLE V

A reactor equipped with an agitator, a thermometer, a heater, and a condenser set for total reflux is charged with 600 parts 2,4-tolylene diisocyanate and 80 parts methyl isobutyl ketone. Over a period of one hour 404 parts of an acrylate composition containing 400 parts 2-hydroxyethyl acrylate and 4 parts hydroquinone is added. During the initial part of the addition, the exotherm causes the temperature to rise to 35° C. The temperature is thereafter maintained in the range of from 35° C. to 40° C. during the remainder of the addition. After the addition has been completed, 31 parts methyl isobutyl ketone is used to rinse any residuum of the added acrylate composition into the reaction mixture. The reaction mixture is then held for four hours and poured into containers. The product is an intermediate composition.

A reactor equipped with an agitator, a thermometer, a heater, a condenser set for total reflux and a source of nitrogen is charged with 640 parts butyl acetate. A nitrogen blanket is applied and the reaction mixture is heated to reflux. The addition of 505 parts of a methacrylate monomer composition containing 250 parts isobutyl methacrylate, 250 parts 2-hydroxyethyl methacrylate and 5 parts isooctylthioglycolate is begun. The separate addition of 50 parts of an initiator composition containing 25 parts tert-butyl perbenzoate and 25 parts butyl acetate is also begun at this time. Reflux is maintained during the additions. Two hours after beginning the additions, the addition of the methacrylate monomer composition is completed. Thirty-five parts butyl acetate is used to rinse any residuum of the methacrylate monomer composition into the reaction mixture. Two and one-half hours after beginning the additions, the addition of the initiator composition is completed. Five parts butyl acetate is used to rinse any residuum of the initiator composition into the reaction mixture. The reaction mixture is then held at reflux for one hour, cooled, and poured into containers. The product is a first methacrylate resin composition.

A reactor equipped with an agitator, a thermometer, a heater, a condenser set for total reflux, and a fritted bubbler tube is charged with 50.5 parts of the above intermediate composition. The addition of 150 parts of a second methacrylate resin composition containing 100 parts of the above first methacrylate resin composition and 50 parts 2-ethoxyethyl acetate is begun. Twenty-five minutes later the temperature is 11° C. and the addition is completed. Eight hours and 35 minutes later the temperature is 19° C. and the agitator is turned off. Nine hours and 40 minutes later the agitator and heater are turned on and the reaction mixture is heated to 35° C. Five hours and 20 minutes later the temperature is still at 35° C. and 72.2 parts of the first methacrylate resin composition is added. The reaction mixture is held at 35° C. for 9 hours. The heater and the agitator are then turned off and the reaction mixture is allowed to cool to room temperature. Ten hours later the agitator is turned on. One hour later 100 parts 2-butoxyethanol is added. Fifty minutes later 20 parts 2-butoxyethanol and 23.6 parts of a composition containing 15.2 parts dimethylethanolamine and 8.4 parts water are sequentially added and the addition of 10 parts sulfur dioxide through the fritted bubbler tube is begun. Eight minutes later the addition of sulfur dioxide is completed. After holding for 62 minutes, 18.9 parts of a composition containing 10.9 parts dimethylethanol amine and 8 parts water is added. Seven parts sulfur dioxide is then added through the fritted bubbler tube. The reaction mixture is then held for one hour and found to be dispersible in water. After holding for another hour, the reaction mixture is poured into containers. The product is a water dispersible sulfonated resin composition.

We claims:

1. Polymer capable of being dissolved or colloidally dispersed in a liquid medium, said polymer containing at least one organic sulfonate-containing group, which group is represented by the formula:

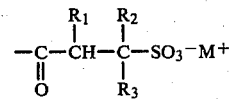

wherein:
$R_1$, $R_2$, and $R_3$ are each individually hydrogen or a monovalent organic group having a molecular weight in the range of from 15 to about 250; and
$M^+$ is a monovalent cation or a monovalent fractional part of a polyvalent cation, which is ionically associated with the $-SO_3^-$ portion of said organic sulfonate group.

2. The polymer of claim 1 wherein said polymer contains a plurality of said organic sulfonate-containing groups, which groups individually are represented by said formula.

3. The polymer of claim 1 wherein said polymer is a linear polymer.

4. The polymer of claim 1 wherein said polymer is a branched polymer.

5. The polymer of claim 1 wherein said polymer is a polyester.

6. The polymer of claim 1 wherein said polymer is an alkyd.

7. The polymer of claim 1 wherein said polymer is a uralkyd.

8. The polymer of claim 1 wherein $M^+$ is alkali metal, monovalent fractional part of alkaline earth metal, unsubstituted ammonium, or substituted ammonium.

9. The polymer of claim 1 wherein M+ is an alkali metal.

10. The polyester of claim 1 wherein M+ is trisubstituted ammonium.

11. The polymer of claim 1 wherein M+ is trialkyl-substituted ammonium.

12. The polymer of claim 1 wherein M+ is N,N-dialkyl-N-hydroxyalkylammonium.

13. The polymer of claim 1 wherein M+ is N,N-dimethyl-N-(2-hydroxyethyl)ammonium.

14. The polymer of claim 1 wherein $R_1$, $R_2$ and $R_3$ are each independently hydrogen, alkyl, cycloalkyl, aryl,

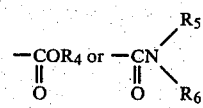

and $R_4$, $R_5$ and $R_6$ are each independently hydrogen, alkyl, cycloalkyl or aryl.

15. The polymer of claim 1 wherein $R_1$, $R_2$ and $R_3$ are each hydrogen.

16. The polymer of claim 1 wherein $R_1$ and $R_2$ are each hydrogen and $R_3$ is methyl.

17. The polymer of claim 1 wherein $R_1$ is methyl and $R_2$ and $R_3$ are both hydrogen.

18. The polymer of claim 1 having a number average molecular weight of at least about 1000.

19. The polymer of claim 1 having a number average molecular weight in the range of from about 1000 to about 150,000.

20. The polymer of claim 1 having a number average molecular weight in the range of from about 1000 to about 50,000.

21. The polymer of claim 1 wherein the sulfonate group content of said polymer is in the range of from about 0.1 to about 3 millimoles of sulfonate groups per gram of polymer.

22. The polymer of claim 1 wherein said polymer also contains at least one carboxyl group.

23. The polymer of claim 1 wherein said polymer also contains a plurality of carboxyl groups.

24. A method for producing a product polymer capable of being dissolved or colloidally dispersed in a liquid medium, said method comprising:
(a) condensing each of at least some of the reactive groups of an intermediate polymer containing said reactive groups with the complementary reactive group of a compound containing both said complementary reactive group and ethylenic unsaturation conjugated by at least one carbonyl group, to thereby provide said intermediate polymer with pendent groups containing said ethylenic unsaturation; and
(b) reacting said ethylenic unsaturation of at least some of said pendent groups with bisulfite salt, metabisulfite salt, a mixture of bisulfite salt and metabisulfite salt or precursor thereof to provide at least one sulfonate group to said reacted pendent groups.

25. The method of claim 24 wherein said compound is maleic acid, maleic anhydride, acrylic acid, methacrylic acid or crotonic acid.

26. The method of claim 24 wherein said ethylenic unsaturation of at least some of said pendent groups is reacted with said precursor, said precursor being sulfur dioxide, amine and water.

* * * * *